United States Patent [19]

Katznelson

[11] Patent Number: 4,719,505
[45] Date of Patent: Jan. 12, 1988

[54] COLOR BURST REGENERATION

[75] Inventor: Ron D. Katznelson, San Diego, Calif.

[73] Assignees: M/A-COM Government Systems, Inc.; Cable/Home Communication Corp., both of San Diego, Calif.; part interest to each

[21] Appl. No.: 909,511

[22] Filed: Sep. 19, 1986

[51] Int. Cl.⁴ .............................................. H04N 9/455
[52] U.S. Cl. ....................................................... 358/19
[58] Field of Search ...................... 358/17, 19, 11, 148, 358/150

[56] References Cited

U.S. PATENT DOCUMENTS

| 4,373,168 | 2/1983 | Mizukami | 358/19 |
| 4,468,687 | 8/1984 | Munezawa | 358/19 |
| 4,626,913 | 12/1986 | Gurumurthy | 358/19 |

Primary Examiner—Michael A. Masinick
Attorney, Agent, or Firm—Edward W. Callan

[57] ABSTRACT

A system for regenerating a standard-length color burst signal from a less-than-standard-length color burst information signal of a given frequency and phase. The system includes a phase-locked loop for generating a system clock signal from the color burst information signal, with the clock signal having a clock frequency related to and at least twice the given frequency of the color burst information signal. The phase information from the color burst information signa is sampled and stored in a RAM. The sampling is clocked by the system clock signal. A standard-length color burst signal is regenerated at the given frequency and in phase with the color burst information signal by retrieving the stored phase information and extrapolating the standard-length signal in accordance with the retrieved phase information. Such retrieval is clocked by the system signal. The phase-locked loop is a digital phase-locked loop; and the color burst information signal is converted into a digital color burst information signal for processing by the phase-locked loop and for sampling and retrieval of the phase information. Upon retrieval and extrapolation of the phase information samples, the retrieved and extrapolated phase information samples are converted into an analog sample information signal, which is converted into a regenerated sinusoidal standard-length color burst signal by a low pass filter.

5 Claims, 5 Drawing Figures

COLOR BURST REGENERATION

BACKGROUND AND SUMMARY OF THE INVENTION

The present invention generally pertains to television signal processing and is particularly directed to regeneration of a color burst signal.

In order to conserve transmission bandwidth, it may be desirable to transmit a less-than-standard-length color burst information signal with a video information signal in lieu of a standard-length color burst signal. For example, when transmitting a scrambled television signal, an original standard-format video signal, as shown in FIG. 1A, containing a sinusoidal color burst signal 10 preceding the video information 12 in each horizontal line is converted into a format, such as shown in FIG. 1B, wherein a color burst information signal 14 of less than standard length, but phase coincident with the color burst signal 10 in the original video signal (FIG. 1A) is positioned between segments of audio and/or control information 16 and video information 18. Typically the less-than-standard length color burst information signal 14 in the converted signal is formed by truncating the color burst signal 10 in the original video signal and thus has the same frequency and phase as the standard-length color burst signal in the original video signal.

The present invention provides a system for regenerating a standard-length color burst signal from a less-than-standard-length color burst information signal of a given frequency and phase. The system of the present invention includes means for generating a system clock signal from the color burst information signal, with the clock signal having a clock frequency related to and at least twice the given frequency of the color burst information signal; means for sampling and storing phase information from the color burst information signal, wherein said sampling is clocked by the system clock signal; and means for regenerating a standard-length color burst signal at the given frequency and in phase with the color burst information signal by retrieving and extrapolating the stored phase information, wherein said retrieval is clocked by the system clock signal.

Additional features of the present invention are described with reference to the description of the preferred embodiment.

DESCRIPTION OF THE PREFERRED EMBODIMENT

Figure 2:
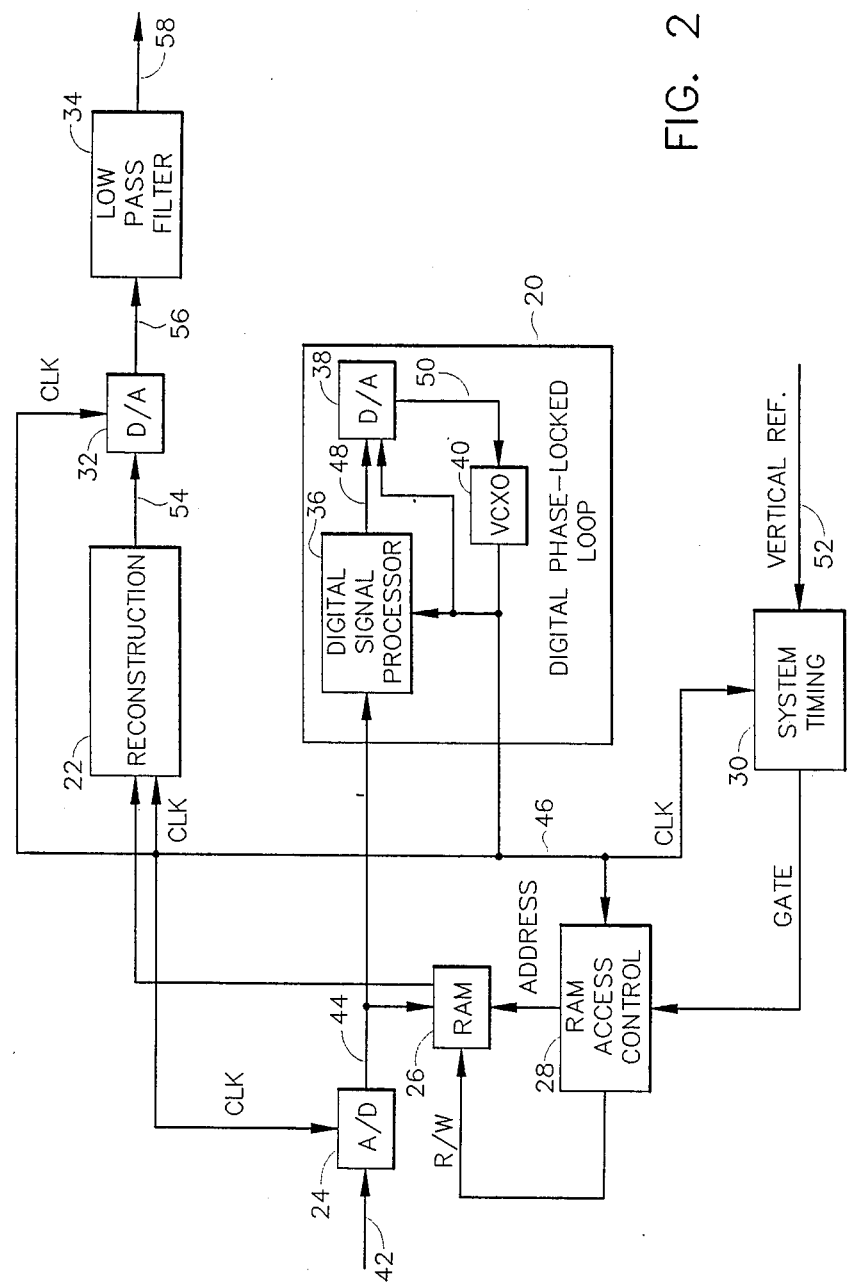
FIG. 2 is a block diagram of a preferred embodiment of the color burst regeneration system of the present invention.

Referring to FIG. 2, a preferred embodiment of the color burst regeneration system includes a digital phase-locked loop 20, a reconstruction unit 22, an analog-to-digital (A/D) converter 24, a random access memory (RAM) 26, an access control unit 28, a system timing unit 30, a digital-to-analog (D/A) converter 32 and a low pass filter 34. The digital phase-locked loop 20 includes a digital signal processor 36, a D/A converter 38 and a voltage-controlled oscillator (VCXO) 40.

Figure 1A:
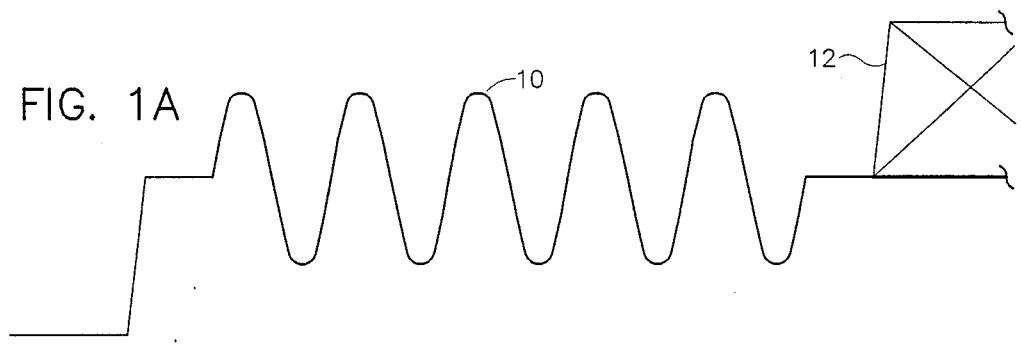
FIG. 1A illustrates a standard-length color burst signal in an original standard-format video signal.
Figure 1B:
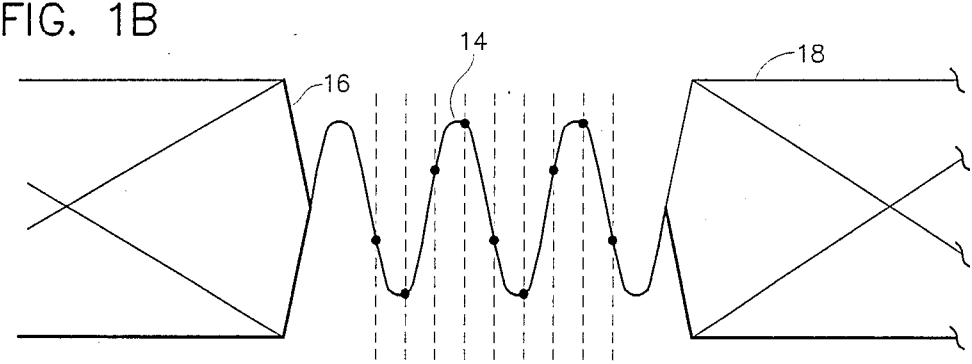
FIG. 1B illustrates a less-than-standard-length color burst information signal in a scrambled video signal, together with the sampling of such color burst information signal.

A color burst information signal 42, such as shown in FIG. 1B, is converted to a digital color burst information signal 44 by the A/D converter 24. The digital phase-locked loop 20 processes the digital color burst information signal 44 to provide a system clock signal 46. The digital signal processor 36 compares the phase of the system clock signal 46 to the phase of the digital color burst information signal 44 and generates an error signal 48 that is converted into a voltage signal 50 by the D/A converter 38. The VCXO 40 responds to the voltage signal 50 by generating the system clock signal. The VCXO 40 defines the frequency of the system clock signal 46 to be four times the frequency of the color burst information signal 42.

The system clock signal 46 is used to clock the operation of the reconstruction unit 22, the A/D converter 24, the RAM access control unit 28, the system timing unit 30, the D/A converter 32, and the D/A converter 38.

The RAM access control unit 28 is clocked by the system clock signal 46 for controlling the storage of information in and the retrieval of information from the RAM 26. The RAM access control unit 28 causes the digital color burst information signal 44 to be sampled for storing phase information derived from the color burst information signal 42 in the RAM 26 four times over each cycle of the color burst information signal 42. Exemplary sampling points $S_1, S_2, \ldots, S_8$ are shown in FIG. 1B. These samples are clocked by the system clock signal 46.

The system timing unit 30 responds to a vertical reference signal 52 for determining when during each received scrambled video signal line (FIG. 1B) the color burst information signal 42 should be present and when during each reconstructed video signal line the regenerated color burst signal is to be inserted, and gates the RAM access control unit 28 accordingly for controlling when phase information is stored in and retrieved from the RAM 26.

Retrieval of the phase information from the RAM 26 is gated in advance of the time when the regenerated color burst signal is to be inserted in each reconstructed video line so as to allow adequate time for regeneration of a standard-length color burst signal. The reconstruction unit 22 processes the retrieved samples of phase information taken during the less-than-standard-length color burst information signal and extrapolates the sampled phase information over the duration of a standard-length color burst signal. The reconstruction unit 22 provides a full-length extrapolated samples signal 54 to the D/A converter 32 which provides a reconstructed analog color burst sample signal 56, as shown by the sample points $S_n$ (n=1 to 8) in FIG. 1C, to the low pass filter 34. It should be noted that the signal shown in FIG. 1C is not coincident in time with the signal shown in FIG. 1B.

Figure 1C:
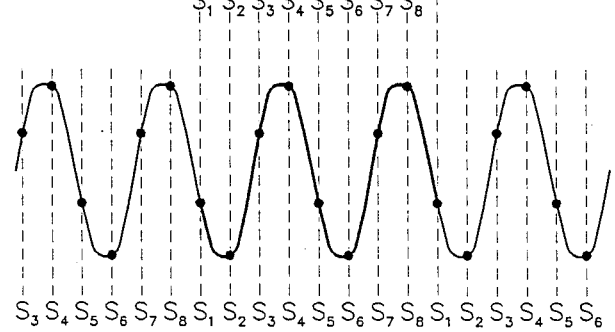
FIG. 1C illustrates the regeneration of a color burst signal from retrieved phase information that was stored upon sampling the color burst information signal of FIG. 1B.

The analog color burst sample signal 56 is passed through the low pass filter 34 to provide a regenerated sinusoidal color burst signal 58, as shown by the sinusoidal waveform in FIG. 1C. The low pass filter 34 provides a sinusoidal signal from the sample points in the sample signal 56 in accordance with Nyquist's sampling theorem, which states that at least two samples per cycle will completely characterize a band-limited signal.

Figure 1D:
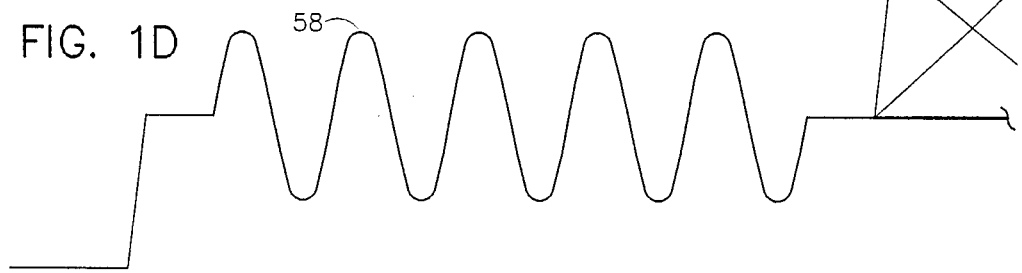
FIG. 1D illustrates a reconstructed video signal including a regenerated color burst signal.

The regenerated standard-length color burst signal 58 is inserted in the reconstructed video signal at the appropriate time, as shown in FIG. 1D.

I claim:

1. A system for regenerating a standard-length color burst signal from a less-than-standard-length color burst information signal of a given frequency and phase, comprising
   means for generating a system clock signal from the color burst information signal, with said clock signal having a clock frequency related to and at least twice the given frequency of the color burst information signal;
   means for sampling and storing phase information from the color burst information signal, wherein said sampling is clocked by the system clock signal; and
   means for regenerating a standard-length color burst signal at the given frequency and in phase with the color burst information signal by retrieving and extrapolating the stored phase information, wherein said retrieval is clocked by the system clock signal.

2. A system according to claim 1, wherein the clock signal generation means comprises
   a phase-locked loop for locking the system clock signal to the color burst information signal.

3. A system according to claim 2, wherein
   the phase-locked loop is a digital phase-locked loop;
   the system further comprises means for converting the color burst information signal into a digital color burst information signal;
   the sampling and storage means sample the digital color burst information signal, and includes a RAM for storing the sampled phase information; and
   the color burst signal regeneration means include means for converting the retrieved extrapolated phase information into an analog signal.

4. A system according to claim 3, wherein the color burst signal regeneration means further includes
   a low pass filter for generating the color burst signal as a sine wave from the analog signal containing the retrieved and extrapolated phase information.

5. A system according to claim 1, wherein the color burst signal regeneration means includes
   a low pass filter for generating the color burst signal as a sine wave from the retrieved and extrapolated phase information.

* * * * *